United States Patent [19]

Millett et al.

[11] Patent Number: 5,717,912
[45] Date of Patent: Feb. 10, 1998

[54] METHOD AND APPARATUS FOR RAPID FULL TEXT INDEX CREATION

[75] Inventors: Ronald P. Millett, Orem; Robin P. Tuck, Provo; Blaine S. Dennis, Orem; David O. Robertson, Provo, all of Utah

[73] Assignee: Novell, Inc., Provo, Utah

[21] Appl. No.: 663,747

[22] Filed: Jun. 18, 1996

Related U.S. Application Data

[63] Continuation of Ser. No. 3,713, Jan. 13, 1993, abandoned.

[51] Int. Cl.$^6$ ........................... G06F 17/30
[52] U.S. Cl. ............. 395/603; 395/612; 395/761; 395/774
[58] Field of Search .................. 395/606, 601, 395/602, 603

[56] References Cited

U.S. PATENT DOCUMENTS

| | | | |
|---|---|---|---|
| 4,318,184 | 3/1982 | Millett et al. | 395/606 |
| 4,771,385 | 9/1988 | Egami et al. | 364/419 |
| 4,817,036 | 3/1989 | Millett et al. | 395/606 |
| 4,972,349 | 11/1990 | Kleinberger | 395/600 |
| 5,109,433 | 4/1992 | Notenboom | 382/40 |
| 5,153,831 | 10/1992 | Yianilos | 364/413.13 |
| 5,201,048 | 4/1993 | Coulter et al. | 395/600 |
| 5,251,129 | 10/1993 | Jacobs et al. | 364/419.08 |
| 5,297,038 | 3/1994 | Saito | 364/419.11 |
| 5,321,606 | 6/1994 | Kuruma et al. | 364/419.08 |
| 5,321,833 | 6/1994 | Chang et al. | 395/600 |
| 5,375,235 | 12/1994 | Berry et al. | 395/600 |
| 5,383,121 | 1/1995 | Letkemen | 364/419.11 |
| 5,412,807 | 5/1995 | Moreland | 395/600 |

OTHER PUBLICATIONS

Witten, et al., "Models for Compression in Full-Text Retrieval Systems," Data Compression Conference 1991, IEEE, pp. 23-32.

Indexing and Compressing Full-Text Database for CD-ROM Witten et al., Journal of Information Science; Dec., 1990.

Coding for Compression in Full-Text Retrieval Systems Moffat et al., IEEE; Apr., 1992.

Hierarchical Compression Method for Index Lists with Compressed Mode Boolean Operations, Ronald P. Millett, Jul. 26, 1991.

*Primary Examiner*—Thomas G. Black
*Assistant Examiner*—Hosain T. Alam
*Attorney, Agent, or Firm*—Dinsmore & Shohl LLP

[57] ABSTRACT

A computer system and method for document indexing and data retrieval. A full text index is created in two phases. In the first phase, a word list symbol table, an alphabetically ordered list, and a non-repeating word number stream are constructed from the source text. In the second phase, a word number access array and in-memory full text index are constructed and then index data is merged into the final index.

27 Claims, 3 Drawing Sheets

METHOD AND APPARATUS FOR RAPID FULL TEXT INDEX CREATION

This application is a continuation of Ser. No. 08/003,713, filed Jan. 13, 1993, now abandoned.

BACKGROUND OF THE INVENTION

1. Field of the Invention

The present invention relates to information management generally and to full text indexing in particular. A computer system and method for creating a full text index for a set of documents is disclosed.

2. Brief Description of the Prior Art

The introduction and increasingly wide usage of computers in the past thirty years has made heretofore unavailable information increasingly accessible. This "information explosion" has increased exponentially in the past decade with the advent of personal computers (PCs), the large-scale linking of computers via local and wide are networks (LANs and WANs), and related events. As the amount of information increases, management and retrieval of that information has become an increasingly important and complex problem. An essential element to such management and retrieval is indexing.

Indexing is the process of cataloging information in a collection of texts in an efficient and coherent manner so that it can be easily accessed. Most traditional indexing and retrieval schemes are ineffective when dealing with large quantities of variable length document text data. Accordingly, the present invention is directed to solving that problem.

Managing text in the information explosion has been analogized to managing children as they progress from infancy to adulthood:

> When children are small, the parent has almost total physical control over them and can get by with simple management techniques—feed them regularly, change their diapers, and put them down for naps. As they grow, however, children are influenced by friends, reject family rules, and take on characteristics of their own—characteristics often not anticipated by the parent. Managing them becomes more complex and qualitatively different.

Earlene Busch, "Search and Retrieval," *BYTE Magazine*, pp. 271–75, June 1992.

As PCs have risen from their infancy, when relatively small amounts of data (on the order of kilobytes) were accessible by a single PC, to their current state, in which gigabytes of disparate data are accessible from a single PC, old methods for managing and accessing data are no longer effective. The present invention is directed to solving that problem, for both present and future technology.

For a collection of texts, the ability to retrieve data is directly related to the amount and quality of information in the index. For example, the index may contain only the titles of the documents. Or it may contain only certain key terms. The recommended solution (and that of the present invention) is to provide indexing and searching on every word in the collection of texts.

The present invention is in the class of indexing techniques known as full text indexing as is now implemented in the "QuickFinder" feature of the WordPerfect® wordprocessing program. A full text index consists of a word list for a collection of texts which resembles the index of a textbook. It can be viewed as a word list with an ascending order list of numbers associated with each word. Like the index of a book, the numbers refer to the indexing unit, or "granule" (e.g., page 6), where the word occurs in the source text. The core of the problem addressed by full text indexing is how to find documents (or parts thereof) when one does not know by whom they were written, when they were written, or what their contents are, yet one has an idea of the words, phrases, ideas, and possibly the dates involved. Thus, there are generally two search modes contemplated by full text indexers: (1) locate mode, i.e., searches for a specific document known to exist, but about which only fragmentary information is known (e.g., the date or author of the document); and (2) research mode, i.e., searches for documents pertaining to a certain category of information, where it is not known whether the documents exist (e.g., documents pertaining to education in the 19th century).

Due to the large quantity of data that must be indexed today, the major indexing problems to be addressed are the speed of index creation and access and size of the index. Regarding the speed of index creation, because the data being indexed is constantly changing, a full text indexer must be able to create a new index quickly when data changes. The index must also be quick to locate and access information in the index. Also, since storage space is important and the size of the index is closely related to access speed, it is highly desirable that the index be small relative to the data being indexed.

Limited memory availability when building a full text index quickly creates another problem relating to the relative frequency of words being indexed. The DOS environment, for example, is an especially limited environment for indexing. A word like "the" may occur in almost every indexing unit. A word like "optometrist" might occur in only a few indexing units. If the index is created in a single pass, the word list and the index elements for each word must coexist in the computer's memory. When a new word is encountered, the amount of memory necessary to store the references to that word cannot be known until all documents have been read. A series of small memory allocations would make the index for high frequency words inefficient. Large allocations waste memory.

The present invention solves this problem by breaking the index creation into two phases. The first phase focuses solely on the creation of a word list, independent of the occurrence list for each word. The second phase allocates memory and merges the information gathered in the first phase into the full text index which is then compressed. Thus, by delaying the merging of the index until the second phase, the method allows the allocation of the absolute minimum amount of memory for the index while retaining speed.

Another problem critical to the speed of index creation in prior art systems is the structure of the word list symbol table that it is necessary to create in memory as documents are processed. The final index is created from this word list symbol table. A large portion of the processing time required in creating the index in prior art full text indexing systems is spent in building the word list symbol table. The present invention uses the first two letters of each word plus its length to hash into a small binary tree. As disclosed in the Detailed Description of the Preferred Embodiment, this method has been found to decrease the time required to build the word list symbol table fivefold over a conventional binary tree structure.

Finally, indexes must frequently be updated as new documents are created and existing documents are changed and deleted. The present invention discloses a novel computer system and method for such "incremental merges," in which changes are rapidly merged into the existing index.

Thus, a full text indexing method is disclosed which uses a unique index format that is more compact, fast to decompress, fast to update, and more flexible than prior art indexes. The present invention uniquely combines new and existing techniques into a apparatus and method for full text index creation, merging, and updating that is faster and consumes less memory and storage space than prior art indexers.

SUMMARY OF THE INVENTION

A computer system and method for creating a full text index that is faster to create, update, and retrieve from and more compact than known prior art indexes is disclosed. The two phase method creates an in-memory full text index faster than prior art methods. No stop words (words excluded from indexing such as "the") are necessary for this method to be fast and efficient. The full text input is indexed to a specific "granule"or indexing unit (e.g. document, section, page, paragraph, sentence, line). Output of the indexing phases include a complete word list of all words in the indexed documents sorted alphabetically (Alpha List), a binary file that contains the text translated into word numbers and indexing unit boundaries (Non-repeating Word Number Stream), and an uncompressed in-memory complete index. The in-memory complete index is composed of a combination of individual word indexes for each word in the index. The in-memory complete index is then compressed and stored in permanent storage.

A computer system and method for concatenating individual word indexes allows for rapid updating of existing indexes with new or modified documents and for merging indexes together on computers with limited memory resources.

DETAILED DESCRIPTION OF THE PREFERRED EMBODIMENT

The method and system herein disclosed has the purpose of creating a full text index from a set of documents. The documents may contain alphanumeric text of any language and are limited in number only by the available disk storage. The preferred embodiment discussed herein is implemented on the DOS operating system for IBM compatible personal computers. It will be appreciated, however, that the method may be implemented on virtually any digital computer system.

The method and system disclosed reads each word of the selected documents and for each unique word in the set of documents, the index records the "granules" in which the word is found. A granule may be any grouping of words within a document or set of documents, such as a sentence, paragraph, page number, section, chapter, document, etc. The method remains the same regardless of the granule size chosen.

Figure 1:
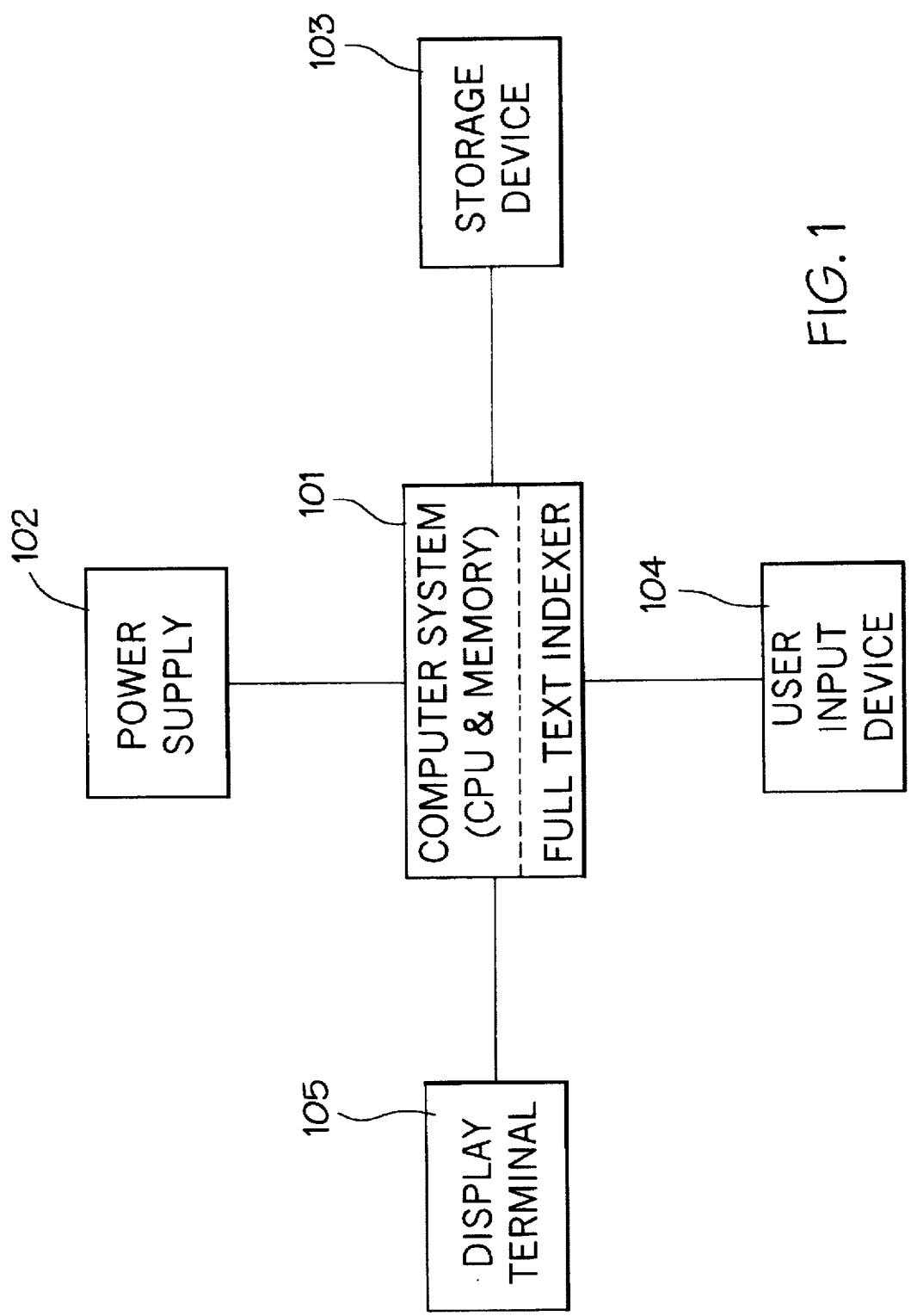
FIG. 1 is a Block Diagram of the Computer System that is the subject of the invention.

Referring to FIG. 1, a block diagram schematically illustrating the computer system is disclosed. The system includes CPU and memory (101) in which the full text indexer is executed, power supply (102), user input device (103), storage device (104), and display terminal (105).

Figure 2:
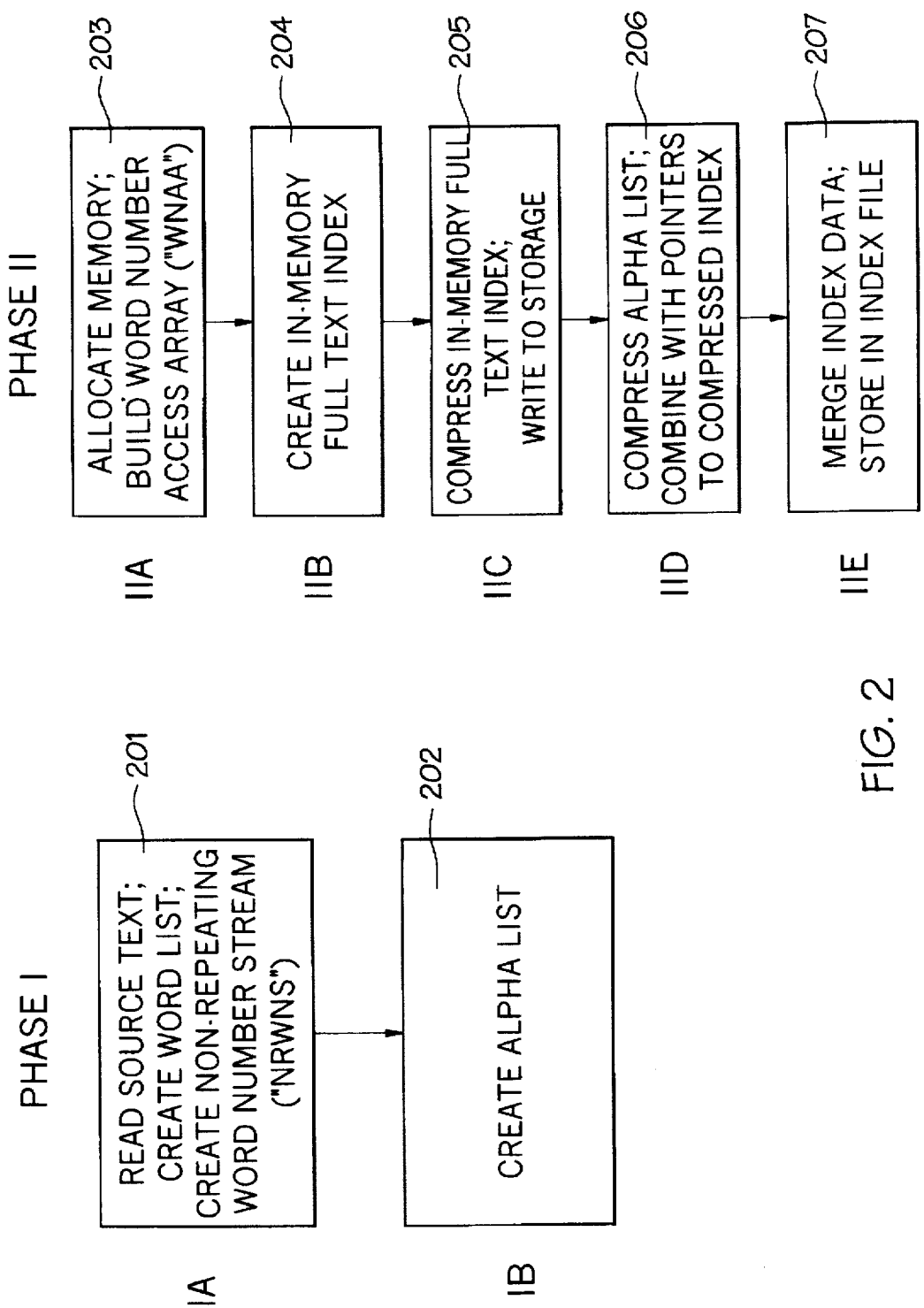
FIG. 2 is a Summary Flowchart of the Method for Rapid Full Text Indexing.

Referring to FIG. 2, a summary flow diagram of the method is disclosed. In Phase IA (201), a selected set of documents are read sequentially from which an in-memory Word List (also called Word List symbol table) and a Non-Repeating Word Number Stream ("NRWNS") are created. A granule cross-reference file is also maintained for recording the document in which each granule occurs. In Phase IB (202), an alphabetized list (the Alpha List) is created from the in-memory Word List and stored in a temporary file. In Phase II, the data compiled in Phase I is processed and merged into a full text index and written to permanent storage. In Phase IIA (203), memory is allocated in a highly efficient manner based on word frequency data gathered in Phase I. A Word Number Access Array ("WNAA") is built which references data necessary to build the final full text index. In Phase IIB (204), an uncompressed in-memory full text index is constructed by sequentially reading the NRWNS and merging the data in the WNAA into the index. In Phase IIC (205), the uncompressed in-memory full text index and WNAA reference list data are compressed into a final full text index and written to storage. Each word's reference list in the WNAA is compressed using a combination of four compression methods—Run Length Encoding, Delta Encoding, Absolute Element Reference, or Bit String Representation. In Phase IID (206), the Alpha List is compressed and each word is combined with a pointer to the final compressed index. Finally, in Phase IIE (207), the index and related data is merged into a single index file.

The preferred embodiment of the method is summarized by the following pseudocode:

1. Initialize Indexer. Open temporary fries.
2. Get next file from the list to index.
3. If no more files or low memory condition (insufficient memory available) then Go to 8.
4. Open the file for processing.
5. Scan through the file (Phase IA). Create the NRWNS file, granularity cross reference file, and the hash-tree in-memory Word List.
6. Close the file.
7. Go to 2.
8. Output the hash-tree in-memory Word List to a file in alpha order (Alpha List) (Phase IB).
9. Allocate memory for uncompressed merged index using the Alpha List (Phase IIA). For low memory machines, portions of the word list are marked for merging the uncompressed index in incremental passes.
10. Read the NRWNS and make the uncompressed in-memory index accessed by the word number (Phase IIB). Low memory machines require multiple passes through steps 10 and 11.
11. Compress the index to a disk file while retaining index cross-reference information in memory (Phase IIC).
12. Create a compressed version of the Alpha List adding pointers to the index and its length (Phase IID).
13. Merge the file, path, and granule cross reference information with the compressed Word List and the index into the final index file (Phase IIE).
14. Finish indexer and close files.

INDEX CREATION

I. Phase I

A. Index a File

First, the selected files are read sequentially, word by word, and two primary data structures are built: the in-memory Word List and the NRWNS. The Word List contains information about each unique word found in the set of selected files. The NRWNS is a temporary data file in which is stored sequentially a representation of the stream of words found in the set of documents, each word being represented by a unique word number. Each unique word in the set of files is assigned a word number sequentially according to the order in which the word first occurs in a file.

Figure 3:
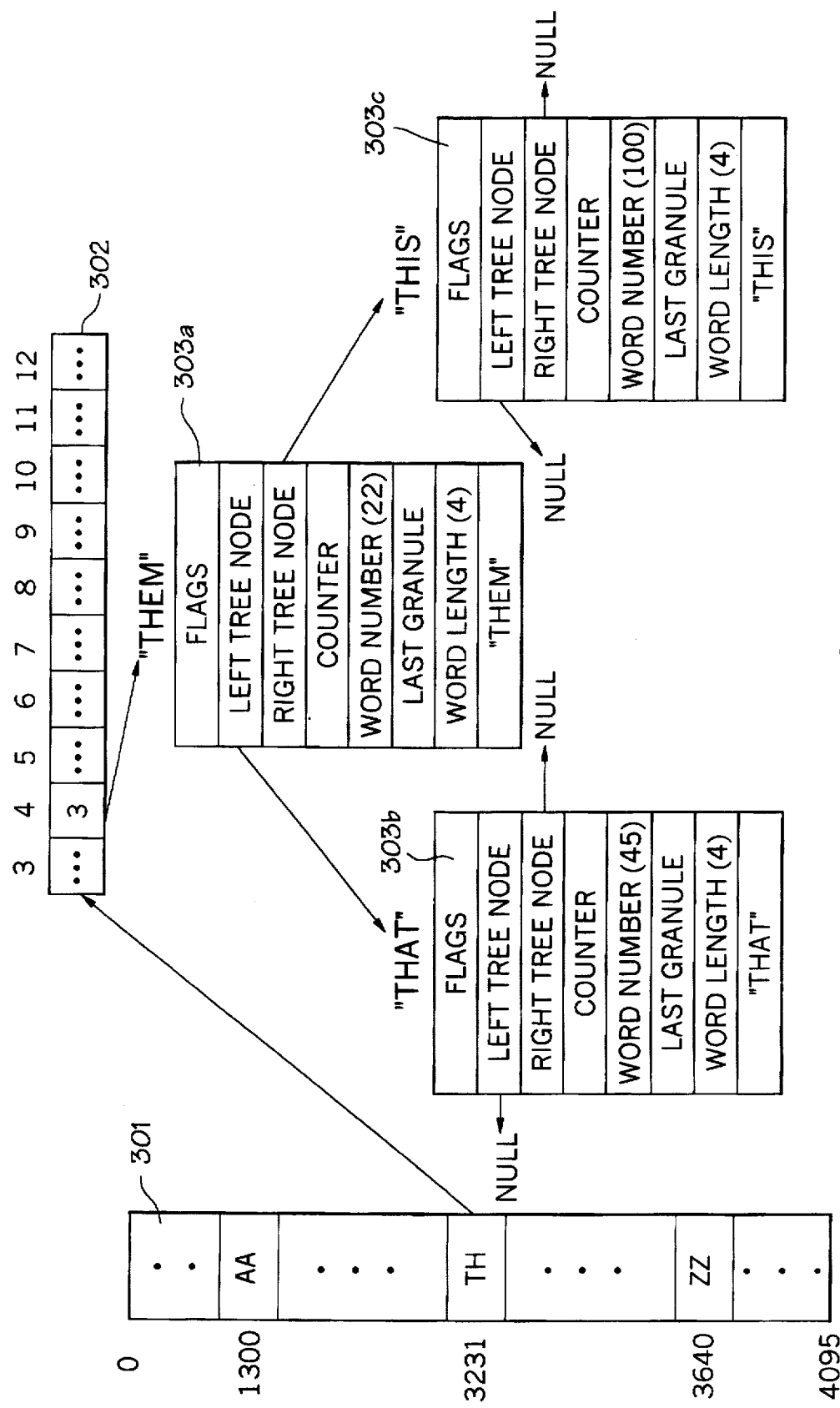
FIG. 3 is a representative portion of the in-memory Word List Data Structure.

The logical structure of the Word List is a key factor for the speed with which the index is created. Each word is stored as a node of a binary tree and is accessed in the Word List based on its first two letters (e.g., "TH" for "THIS" or "THOSE"). Referring to FIG. 3, the Word List comprises a 4096 element table (301). Each element ("hash bucket") of the table is accessed by a unique hash number representing the first two characters of the word (e.g., "TH"). In the preferred embodiment, each character is assigned a value from 0–63 and the hash number is determined according to a hash function wherein the assigned value of the first character is multiplied by 64 and added to the assigned value of the second character (e.g., where "T" has assigned value 50 and "H" has assigned value 31, "TH" hashes to (50*64)+31=3231). In single character words, the second character is assigned value "0". (The 64 characters represented include the letters a . . . z, numbers 0 . . . 9, and international characters.)

Each hash bucket points to (i.e., contains the address of) a separate table (302) having ten elements (or which is NULL). Each element ("sub-bucket") of the ten element table represents a group of words beginning with the particular two characters represented by the unique hash number. Each of the ten elements contains a pointer to a separate binary tree (303a) of words and a count of how many words are in the tree. The first sub-bucket contains words of three characters or less. The second sub-bucket contains words of four characters (e.g., THis, THat). The third sub-bucket contains words of five characters and so on until the tenth sub-bucket which contains words of 12 characters or more. Thus, the data structure potentially contains 40,960 binary trees associated with the Word List.

Each node (303a, 303b, 303c) of a binary tree in the Word List is composed of eight fields:

(1) flags for memory control;

(2) a pointer to the left tree node (or NULL);

(3) a pointer to the right tree node (or NULL);

(4) a counter for the number of granules (units) in which the word occurs;

(5) the unique Word Number associated with the word (assigned sequentially);

(6) the last granule (unit) in which the word was found;

(7) the length of the word; and (8) the actual characters of the word.

In the preferred embodiment, the memory for each word is allocated as a piece of a larger memory allocation unit to avoid wasting overhead space of the allocation system.

The NRWNS is comprised of a series of word numbers demarcated by granule boundary indicators, in the following form:

[100 45 22<New Granule> 201 34 . . . <New Granule> . . . 50 20 1 . . . ], where numbers represent the word numbers assigned to the respective words and <New Granule> represents granule demarcation. The purpose of the NRWNS is to track the granules in which a word occurs, not the total number of occurrences of the word. Thus, the word number for a particular word will only be stored in the NRWNS once for each granule in which it appears. For example, if there are 25 occurrences of the word "the" in the third granule, the word number for "the" will be placed into the NRWNS only once, i.e., upon its first occurrence in the granule. Because the NRWNS is built sequentially as the documents are scanned, it contains a sequential list of the words as they occur in the set of documents.

The Word List is complete after each of the selected documents has been scanned and added to the list.

This step of the preferred embodiment is described in detail by the following pseudocode:

| | |
|---|---|
| 1. | Get a word or granule boundary from the file. When end of file is reached go to 4. |
| 2. | If a granule boundary variable was returned then |
| 2.1 | Increment CurrentGranuleNumber. |
| 2.2 | Output new granule marker to NRWNS. |
| 2.3 | Go to 1. |
| 3. | A word was returned. Now process it. |
| 3.1 | Make hash number based on first two characters of word that preserves sort order (AA before AB) between 0 and 4096. Select this as the main hash bucket. |
| 3.2 | Make another hash number based on length of word (0–9). |
| 3.3 | If no binary tree exists for this hash into the 40,960 possible buckets, create a bucket and create a binary tree. If a low memory condition exists then go to 5, else go to 3.6.1 |
| 3.4 | Otherwise, if the binary tree exists, then traverse the binary tree comparing the new word to words in the tree. |
| 3.5 | If a match is found (old word), then |
| 3.5.1 | If CurrentGranuleNumber > LastUnitCounted for this entry then |
| 3.5.1.1 | If Low Memory Condition then go to 5. |
| 3.5.1.2 | Output this word's word number to the NRWNS. Increment TotalNRRefs. |
| 3.5.1.3 | Set LastUnitCounted for this word to CurrentGranuleNumber. |
| 3.5.1.4 | Increment frequency count for this word. |
| 3.5.2 | Go to 1. |
| 3.6 | If a match is not found, then |
| 3.6.1 | If Low Memory Condition then go to 5. |
| 3.6.2 | Add this new word to the binary tree. |

| | |
|---|---|
| 3.6.3 | Give this word the next available word number. |
| 3.6.4 | Output this word number to the NRWNS. Increment TotalNRRefs. |
| 3.6.5 | Set LastUnitCounted for this word to CurrentGranuleNumber. |
| 3.6.6 | Increment word number variable. |
| 3.6.7 | go to 1. |
| 4. | Output end of file granule marker to NRWNS. Go to 6. |
| 5. | Save address of the current word in the current document for restart. |
| 6. | End Phase IA. |

B. Create Alpha Word List and Output to Disk

Second, a temporary alphabetized list file (the Alpha List) is created from the in-memory Word List. Referring to Table 1, a partial sample list, for each unique word the list contains the word, the word number, and the number of granules in which the word occurred (frequency count).

TABLE 1

| WORD | WORD # | FREQUENCY COUNT |
|---|---|---|
| Alice | 3 | 10 |
| In | 1 | 125 |
| Wonderland | 5 | 7 |

This Alpha List is created by visiting each hash bucket in the 4096 element table. Within each hash bucket, the binary trees under the sub-buckets are traversed and merged into alphabetical order. The information for each word is then written to the Alpha List file as the Word List is traversed.

This phase of the preferred embodiment is described in detail by the following pseudocede:

1. Loop through all 4096 main hash buckets. When done, Go to 10.
2. If bucket is empty then go to 1.
3. Loop through the 10 hash buckets for this main bucket. When done, Go to 7.
4. If bucket is empty then go to 3.
5. Traverse this binary tree and put pointers to word structures in an array.
6. Go to 3.
7. Merge the ten possible lists for the different length words for this main hash bucket in alphabetic order (e.g. that, the, them . . . )
8. Write the word entries to storage including the frequency count, the word number, and the word. While traversing each entry keep statistics from the frequency counts to calculate memory needs for Phase II processing.
9. Go to 1.
10. Free up all memory used by the hash-tree word list structures.
11. Save important information for Phase II, including number of granules in this indexing session, the number of unique words, Phase II memory requirements, index creation control parameters (e.g., granule size), and number of non-repeating references to read in Phase II.

II. Phase II: Index Generation

The final full text index is generated in the second phase as follows.

A. Memory Allocation

The first step to creating the full text index is to allocate memory necessary to build the index. In this step, memory is allocated for an in-memory uncompressed index that will be used to create the final compressed full text index. The primary dynamic data structure used in building the index, and thereby affecting memory allocation, is the WNAA.

TABLE 2

| WORD | WORD # | NEXT | FLAG | REFS | BYTES | MEM | INDEX POINTER |
|---|---|---|---|---|---|---|---|
| NOW | 1 | 12 | 1 | 5 | 2 | 53F5:0004 | 13 |
| IS | 2 | 8 | 1 | 5 | 2 | 53F5:0000 | 10 |
| THE | 3 | 13 | 1 | 7 | 1 | 53F5:0008 | 17 |
| TIME | 4 | 9 | 1 | 4 | 1 | 53F5:000C | 20 |
| FOR | 5 | 7 | 1 | 4 | 2 | 53F4:000C | 6 |
| ALL | 6 | 10 | 1 | 4 | 1 | 53F4:0006 | 2 |
| GOOD | 7 | 2 | 1 | 4 | 2 | 53F4:000E | 8 |
| MEN | 8 | 1 | 1 | 4 | 1 | 53F5:0002 | 12 |
| TO | 9 | 0 | 1 | 4 | 2 | 53F5:000E | 21 |
| COME | 10 | 14 | 1 | 4 | 1 | 53F4:0008 | 3 |
| AID | 11 | 6 | 1 | 4 | 2 | 53F4:0004 | 0 |
| OF | 12 | 3 | 1 | 5 | 2 | 53F5:0006 | 15 |
| THEIR | 13 | 4 | 1 | 5 | 2 | 53F5:000A | 18 |
| COUNTRY | 14 | 5 | 1 | 5 | 2 | 53F4:000A | 4 |

Referring to Table 2, the WNAA contains an entry for each unique word. Each entry includes a field for index type (Flag), pass number, alphabetic order (Next), the total number of index references for the word (Refs), the size (in bytes) of the compressed index for this word, and a pointer to the memory location (and later the disk location) of the index for the particular word (the index is first located in memory and later saved in storage after compression). In Table 2, sample WNAA data is shown for a document containing the sentence "Now is the time for all good men to come to the aid of their country." (The pass number (not shown) for each entry is 1).

The mount of memory allocated is determined by the number of granules processed, the number of unique words, and the frequency of occurrence of each word. First, the total number of granules processed is used to determine the size in bytes of the number necessary to list the granule number. If the number of granules is less than 65,536, two bytes of memory are allocated for referencing granule numbers. If there are more than 65,536 granules, four bytes are assigned. For each word in the WNAA, a block of memory is allocated according to the format in which the list of granule references for that word will be stored. The format may be either "full bit string" or a "list representation." In a full bit string representation, each bit in the bit string represents a granule, with the bit set to '1' if the word is found in the granule and '0' otherwise. For example, 15 bits are required to represent 15 granules. Since memory is allocated in bytes, 2 bytes (16 bits) would be required for a full bit string representation. If the word occurred in granules 2, 5, 11 and 14, the full bit string representation for the word would be:

0100100000100100

This list representation is composed of a sequential list of the granule numbers in which the word is found. Each number in the list is either 2 or 4 bytes, depending upon the total number of granules processed, as previously discussed. Thus, in the example, assuming each granule number is represented in 2 bytes, the list representation would require 8 bytes (2 bytes for each of the 4 granule numbers—2, 5, 11, and 14).

Memory is then allocated for an index entry for each word in the Alpha List created in Phase IB. The format used is determined by comparing the number of bytes necessary for a full bit string representation (i.e., the bit string threshold), with the number of bytes required for a list representation. The format requiring the least number of bytes is used. Thus, in the example, a full bit string representation would be used.

The Memory Allocation step of the preferred embodiment is described in detail by the following pseudocode:

| | |
|---|---|
| 1. | Remember memory limits for this platform, if any, from Phase I processing. |
| 2. | BitStringSize (bit string vs. reference list representation) = (number of granules processed for this session)/8 + 1. |
| 3. | If number of granules processed < 64K then ListElementSize = 2 bytes. |
| 4. | If number of granules processed ≥ 64K then ListElementSize = 4 bytes. |
| 5. | BitStringThreshold = (BitStringSize + 1)/ListElementSize. |
| 6. | Allocate a table entry for each unique word (WNAA). The structure includes controls, this word's reference count in the index, number of bytes for index piece, and a pointer to the memory location for the uncompressed index for this word number. |
| 7. | Allocate memory for uncompressed index calculated during Phase IB processing. If it does not fit into memory, allocate all memory, then take several passes on phase IIB and IIC. PassNumber = 1. |
| 8. | Read a word from alphabetic word list. When done, Go to 17. |
| 9. | Using the Word Number from Phase I, index into the WNAA. |
| 9.1 | If first word then |
| 9.1.1 | Set HeadWord = WNAAIndexNo (WNAA index number) |
| 9.2 | Else |
| 9.2.1 | SetControls.AlphaNext = WNAAInndexNo |
| 9.2.2 | Set WNAALastIndexNo = WNAAIndexNo |
| 10. | If Frequency Count * ListElementSize is above BitStringThreshold then |
| 10.1 | Memory type = Full Bit String Representation. |

-continued

| | |
|---|---|
| 10.2 | BytesToAllocate = BitStringSize. |
| 11. | Else |
| 11.1 | Memory type = List Representation |
| 11.2 | BytesToAllocate = FrequencyCount * ListElementSize. |
| 12. | If allocation will not fit in the memory block then |
| 12.1 | Increment PassNumber. |
| 12.2 | Initialize pointer to the start of the block and reinitialize the memory in the block. |
| 13. | Allocate BytesToAllocate bytes of memory in block |
| 14. | Increment pointer in block, decrement free bytes in block. |
| 15. | Fill this word's entry in the WNAA with values including memory pointer, Memory type, and PassNumber (in controls). The counter of the references is set initially to zero. |
| 16. | Get next word; go to 8. |
| 17. | PassLimit '2 PassNumber. |

B. Merge in Uncompressed Index

In Phase IIB, the in-memory index is built by reading through the NRWNS file and recording the occurrences in the index for each word in the stream. A granule counter (GranuleNumber) is incremented each time a granule boundary indicator is encountered in the NRWNS and thereby keeps track of the current granule number. Thus, for each word number in the NRWNS beginning with the first word number, the index is updated to reflect the granule number where the word is found. This is done by accessing the memory location for the index for the particular word number via the index pointer in the WNAA entry for that word number. The occurrence of that word number in the current granule is then stored in the index.

The manner in which the occurrence is recorded in the index depends on the format of the index—either full bit string or list representation (as determined in the Memory Allocation step). If the WNAA control indicates that the index for that word is stored in full bit string format, then the granule number(th) bit offset in the index for this word is set (to '1'). For example, if the word is found in the tenth granule, the tenth bit in the bit string is set. If the WNAA control indicates that the index for that word is stored in list representation format, then the granule number is stored in the next available (2 or 4 byte) location in the index for that word. The ReferenceCount field in the WNAA entry for that word number keeps track of the number of times the word number has been referenced.

The in-memory index is complete after the entire NRWNS has been processed.

This step of the preferred embodiment is described in detail by the following pseudocode:

| | |
|---|---|
| 1. | GranuleNumber = 1; PassNumber = 1. |
| 2. | Read entry from NRWNS file. |
| | When done, Go to 5. |
| 3. | If entry is a granule indicator then |
| 3.1. | Increment GranuleNumber. |
| 3.2. | Go to 2. |
| 4. | If entry is a word number then |
| 4.1. | Access this word's structure in the WNAA. |
| 4.2. | If PassNumber < > Passlimit && PassNumber (in Controls) for this word < > PassNumber then Go to 2 (ignore this word number on this pass). |
| 4.3. | If word flags indicate bit string representation then |
| 4.3.1. | Set the GranuleNumber(th) bit offset from the index pointer for this word. |
| 4.3.2. | Go to 2. |
| 4.4. | If word flags indicate list representation then |
| 4.4.1. | If ListElementSize = 2 then Offset = ReferenceCount (for this word) * 2. |
| 4.4.2. | Else Offset = ReferenceCount * 4. |
| 4.4.3. | Add 2 or 4 byte reference depending on ListElementSize at Offset from the index pointer for this word. |
| 4.4.4. | Go to 2. |
| 5. | End of Phase IIB. |

C. Compress Index

In this step of the preferred embodiment, a compressed index is created from the WNAA and written to permanent storage. Each word's reference list is compressed into the index by using a combination of four compression techniques: (1) run length encoding ("RLE"); (2) bit string fragment encoding; (3) delta encoding; and (4) absolute element reference. The present invention uses a combination of the four techniques to compress each word reference list so as to maximize the overall compression ratio achieved (i.e., to minimize the size of the compressed file). Thus, the compression ratio is the ratio of the size of the target file (i.e., the file being compressed) as compared to the size of the compressed file (e.g., 4:1).

Each of the techniques can be found in the prior art, although they have never before been combined as in the present invention. Perhaps the most natural method of encoding a reference list is by absolute reference to the granule numbers containing the word occurrences, e.g., if the word "computer" occurs in granules 1, 2, 7, 9, and 10, the references would be encoded as [1, 2, 7, 9, 10], each element being represented in one or more bytes. This technique is referred to as absolute element reference.

Depending upon the characteristics of a particular reference list, however, the absolute element reference technique does not always achieve the maximum compression ratio. In fact, it most often does not achieve optimal compression. Thus, four techniques are utilized, each of which achieves greater compression than the others in a particular word frequency environment.

For example, the RLE technique represents reference lists in terms of "runs" of consecutive occurrences (e.g., if the word "computer" occurs on pages 5 through 16, the list would be represented by the first occurrence, 5, and the number of consecutive occurrences thereafter, 11 (16 minus 5), rather than listing each occurrence separately—5, 6, 7, . . . 16). RLE is therefore most efficient when occurrences tend to be lumped in contiguous granules. See Lynch, *Data Compression: Techniques and Application*, p. 144.

When a list is characterized by sporadic (but frequent) occurrences, bit string encoding tends to be the most efficient method. A bit string includes a bit for each granule in the list, with a '1' bit representing an occurrence of the word and a '0' representing a nonoccurrence. Thus, if the word "computer" occurred on pages 13, 15, 17, 19, 20, and 23, a 12-bit bitstring could be used, starting at granule 13, with a value of "101010110010". This compression element is also referred to as a "bit map". See Knuth, *Fundamental Algorithms Volume I*, p. 299.

Delta encoding is used to represent relatively small jumps between word occurrences when they are infrequent and there are a large number of granules. For example, suppose there are occurrences in granules 500, 520 and 550. RLE is not efficient because it would achieve the same compression as absolute element reference (i.e., [500, 520, 550]). Bit-string encoding is inefficient because there would be a large number of wasted '0' bits in the bit string representation. Delta encoding is most efficient when the reference list is so characterized, particularly where the delta between occurrences is a much smaller number than the absolute reference number and, consequently, can be represented in one byte (i.e., less than 256) rather than requiring several bytes. See Lynch, *Data Compression: Techniques and Application*, p. 94. Delta encoding is used in the preferred embodiment only when the delta can be represented in two bytes or less.

The method of the present invention recognizes that words and documents have varying word frequency environments and, therefore, uses a unique combination of the four techniques to achieve a greater compression ratio than could be achieved by using any of the individual techniques exclusively. The compression ratio achieved with this method is greater than any known in the prior art. For example, the method of the present invention typically compresses a "document level" index (i.e., where granules are whole documents) to 4–5 percent of the size of the actual text, whereas prior art document level indexes achieve index compression of 8–20 percent. The present invention compresses "paragraph level" indexes to 10–20 percent of the size of the text, whereas prior art paragraph level indexes achieve compression of 15–50 percent.

In the preferred embodiment, the four compression techniques are encoded as shown in Table 3:

TABLE 3

| Length (Bytes) | Control Bits | Data Bits | Description |
|---|---|---|---|
| 1 | 00 | 6 | One Byte Delta |
| 1 | 010 | 5 | RLE Delta One |
| 1 | 011 | 5 | Bitstring Fragment |
| 2 | 1000 | 12 | Two Byte Delta |
| 2 | 1001 | 12 | RLE Delta One |
| 2 | 1010 | 12 | Bitstring Fragment |
| 1 | 10110 | 3 | Control Op Code |
| 1 | 10111 | 3 | Control Op Code |
| 3–16 | 1100 + N (N < 16) | 8*N | Bitstring Fragment |
| 3 | 1101 | 20 | Three Byte Absolute |
| 4 | 1110 | 28 | Four Byte Absolute |
| 5 | 1111 | 36 | Five Byte Absolute |

TRIGGERING METHOD

The next step of the method of the preferred embodiment is to visit each entry in the WNAA and determine, via a "triggering method," which combination of the four compression techniques to use for each word's reference list. The triggering method analyzes the references for each word in the WNAA and, based on the pattern and frequency of occurrences, uses one or more of the four compression techniques to encode the reference list.

In general, ten or more consecutive references are always encoded using RLE, large jumps between references are encoded with absolute element reference, and most other occurrence patterns are delta encoded. For example, as the reference list is traversed, when the number of granules between references is large enough (i.e., >4095), the absolute element reference method is triggered and immediately output to the encoded list. However, reference lists for many words will have more frequent occurrences and, therefore, require a more sophisticated manner of determining which encoding method to use and when to output the encoded data. Thus, the triggering method essentially recognizes potential boundary conditions where a particular method will be at its maximum compression efficiency. When a defined boundary condition is recognized by the triggering method, either a bitstring or an RLE/delta combination will be output based on the method that takes the least space, and a buffer which maintains current data for each method is cleared (except for trailing RLE).

The following are the boundary conditions defined by the triggering method in the preferred embodiment:

1. Absolute Element Reference. When there are more than a threshold number of granules between references (4095 in the preferred embodiment, i.e., delta>4095), the later reference is output as an absolute element reference. For example, for reference list [1, 5, 10942, 11050], when 10942 is reached, delta is 10937. Thus, the absolute reference of 10942 is output.

2. RLE. When the only current element is RLE, there has been a run of ten or more consecutive references, and the current delta is greater than one, RLE is used for the run. For example, for reference list [1-14, 20], when 20 is reached, delta is 6, and length 14 run is output in RLE format. Also, when the RLE limit of 4095 consecutive references is reached, the 4095-granule run is output in RLE format.

3. Delta Encoding. When the only current element is delta encoded, the current delta is greater than or equal to 8, and consecutive references are encountered, then the delta value is output. For example, for reference list [9, 10, 11, 12, 14], when 10 is reached, delta has a value of 9 and it is output.

4. Smallest of RLE/Delta or Bitstring. When the current delta between references is greater than or equal to the sum of 8 plus the number of bits left in the current bitstring, then either a bitstring or RLE/delta encoded representation is output, depending upon which uses less bytes. For example, for reference list [2, 3, 10, 24, 25, 29], when 24 is reached, a 2-byte bitstring with 12 data bits—'011000000100'—is output. That is, when 24 is reached, the current delta is 14 and the current bitstring is '0110000001' (length 10). There are 2 bits left in the 12-bit bitstring. Thus, since the condition is met (14>8+2), the size of the bitstring representation is compared with the size of the delta representation. In this case, delta encoding of the [2, 3, 10] reference list fragment would require 3 bytes, i.e., one byte each for delta values of 2, 1, and 7. However, since the bitstring representation requires only 2 bytes, it is selected.

5. Smallest of RLE/Delta or Bitstring. The maximum bitstring representation is 120 bits (16 bytes, with one control byte). Thus, when the current bitstring reaches its maximum size and there is either more than one current element (RLE/delta combination) or the last element output is not RLE, then the smaller of either a RLE/delta or bitstring representation is output. For example, for the reference list [1, 3, 5, 7, . . . 119, 121], a 16-byte bitstring representation ('1010101010 . . . ') would be output. That is, when 121 is reached, the bitstring has reached its maximum 120 bits and the last element is not RLE. Thus, the condition has been met. It would take 60 bytes if delta encoding were used (i.e., 60 one-byte delta values of 2), but only 16 bytes using bitstring. Thus, bitstring is output.

6. Smallest of RLE/Delta or Bitstring. When there is (a) more than one element in the RLE/delta buffer, (b) current delta has a value of one, (c) the last buffer element is RLE, and (d) it has a value of 5 or greater, then the smaller of either RLE/delta and bitstring is output. For example, when 25 is reached in the reference list [1, 5, 11, 17, 18, 19, 20, 21, 22, 23, 24, 25, 26], the current delta value is one and the last buffer element is RLE with a value of 8. The delta encoded/RLE representation requires 5 bytes (4 bytes of delta values of 1, 4, 6 and 6, and one byte with RLE value of 8), while the bitstring representation requires only 4 bytes ('10001000001000001111111' plus control bits). Thus, bitstring is output.

The boundary conditions described above are defined so as to achieve maximum compression for documents with a broad spectrum of word frequency characteristics. They do not, however, represent the only boundary conditions with which the triggering method can work efficiently.

The Compress Index step of the preferred embodiment is described in detail by the following pseudocode:

| | |
|---|---|
| 1. | Loop alphabetically through the WNAA from 1 to number of unique words. If pass number for this word < > PassNumber then next word. When done, Go to 19. |
| 2. | Access this word's structure in the WNAA. |

-continued

| | |
|---|---|
| 3. | LastElement = 0. |
| | IntermedBuffCount = 0. |
| | IndexElementBuffStart = 0. |
| | OverFlowBitStringRep = 0. |
| | TotalBytesForIndex = 0. |
| | CurrentBitStringNumBits = 5. |
| | CurrentBitNumber = 1. |
| 4. | Loop through the number of references for this word. When done, go to 16. |
| 5. | Get next index reference (IndexElement) from full bitstring or reference list for this word. Add in starting offset if this index started at non-zero offset--memory tight multiple indexes that will later be merged into one. |
| 6. | Delta = IndexElement − LastElement. |
| 7. | Trigger = 0. WriteRDAElement = 0. |
| 8. | If IntermedBuffCount == 1 then (Single index element in RDA) If the index element is RLE type and its value ≥ 10 and Delta < > 1, OR the index element is RLE type and its value ≥ 4095, OR the index element is DELTA type and its value ≥ 8, OR the single index element is ABSOLUTE type, Then WriteRDAElement = 1. |
| 9. | If WriteRDAElement == 0 then |
| 9.1. | If Delta ≥ (8 + (bits left for bitstring fragment, e.g., 12 − 7 = 5)) then Trigger = 1. (fragment sizes are 5, 12, 16, 24, . . . 120). |
| 9.2. | If (IndexElement − IndexElementBuffStart) ≥ 120 (bit string fragment limit) AND (IntermedBuffCount > 1 OR last index element is NOT type RLE) Then Trigger = 1. |
| 9.3. | If IntermedBuffCount > 1 AND Last element is RLE AND Delta > 1 AND RLE value ≥ 5 AND CurrentBitNumber == CurrentBitStringNumbits then Trigger = 1. |
| 10. | If WriteRDAElement == 1 OR Trigger == 1 then |
| 10.1. | Compute length of RLE/DELTA/ABSOLUTE representation and length of bit string fragment representation. |
| 10.2. | If RDA length ≤ bit string fragment length OR WriteRDAElement == 1 OR OverflowBitStringRep == 1. |
| 10.2.1. | WriteLastRLE = 1. |
| 10.2.2. | If Delta == 1 then WriteLastRLE = 0. |
| 10.2.3. | Write RLE/DELTA/ABS elements to compressed index except last RLE if WriteLastRLE == 0. |
| 10.2.4. | Add length of RDA representation to TotalBytesForIndex. |
| 10.2.5. | If WriteLastRLE == 0 and the last was an RLE, then IntermedBuffCount = 1. |
| 10.2.6 | Else IntermedBuffCount = 0. |
| 10.3 | Else |
| 10.3.1. | Write bitstring fragment to disk. |
| 10.3.2. | Adjust delta to align with bits still unused to get to the bit string fragment boundary. (5, 12, 16, 24 . . . bits). Delta = Delta − CurrentBitStringNumBits + CurrentBitNumber. (e.g. Delta = 15 − 12 + 9 = 12). |
| 10.3.3. | Add length of this Bit String Fragment to TotalBytesForIndex. |
| 10.3.4. | IntermedBuffCount = 0. |
| 10.4. | OverflowBitStringRep = 0. IndexElementBufStart = IndexElement − Delta. Initialize Bit String Fragment buffer to 0s. CurrentBitNumber = 0. CurrentBitStringNumBits = 5. /* end of comparing Bit String vs. RDA representation */ |
| 10.5 | If IntermedBuffCount == 1 AND type is RLE then |
| 10.5.1 | Init BitString with '1' bits up to the RLE length |
| 10.5.2 | CurrentBitNumber = RLE count |
| 10.5.3 | set CurrentBitStringNumBits to next higher bit boundary number (5, 12, 16, 24, . . . 120) (e.g., if CurrentBitNumber == 13 then CurrentBitStringNumBits = 16) |
| 11. | If Delta == 1 AND current RDA entry == RLE, then add 1 to this RLE element, if RLE count ≤ 4096. |
| 12. | Else Create new RLE, Delta or Absolute element depending on the delta value. Increment IntermedBuffCount. |
| 13. | If this delta does't stretch past the 120 bit limit, then set the bit in the bit string fragment. |
| 13.1 | CurrentBitNumber = CurrentBitNumber + delta |
| 13.2 | Mark bit number CurrentBitNumber with '1' |
| 13.3 | If CurrentBitNumber > CurrentBitString then set CurrentBitStringNumBits to next higher bit boundary number (5, 12, 16, 24, . . . 120) |

-continued

| | | |
|---|---|---|
| 14. | Else OverflowBitStringRep = 1. | |
| 15. | LastElement = IndexElement. | |
| | Continue looping on next reference for this word. | |
| | go to 4. | |
| 16. | If IntermedBuffCount ≥ 0 then | |
| 16.1. | Compute length of RLE/DELTA/ABSOLUTE representation and length of bit string fragment representation. | |
| 16.2. | If RDA length ≤ bit string fragment length OR OverflowBitStringRep == 1, then | |
| 16.2.1. | Write RLE/DELTA/ABS elements to compressed index. | |
| 16.2.4. | Add length of RDA representation to TotalBytesForIndex. | |
| 16.3. | Else | |
| 16.3.1. | Write bitstring fragment to disk. | |
| 16.3.3 | Add length of this Bit String Fragment to TotalBytesForIndex. | |
| 17. | Done with this word's index. Remember index offset and length for next steps. Keep this information in the WNAA structure. | |
| 18. | Store compressed index offset for this word in memory pointer variable in WNAA; store index length for this word in WNAA. | |
| 19. | Proceed to next word, go to 1. | |
| 20. | Increment PassNumber. | |
| 21. | If PassNumber ≤ PassLimit then reloop through IIB and IIC. | |
| 22. | Done with all words for all passes. End of Phase IIC. | |

D. Compress Word List

This step of the method creates an alphabetically ordered temporary file of index data for each word by reading sequentially through the Alpha List, retrieving index data for each word from the WNAA, and storing the data in a temporary file. For each word in the list, the index data is compressed into a variable length record comprising:

the length of the record (1 byte);

the number of index references (1–4 bytes);

the offset for this index within the temporary file (1–4 bytes);

the number of bytes in the index for this word (1–4 bytes);

the left end compaction count (1 byte); and the word itself (1-N bytes).

The left end compaction count field contains the number of consecutive letters, reading left to right, that the current word has in common with the previous word (e.g., where "the" precedes "them", the count would be 3). Every 10K bytes, the currently processed word is stored in order to create a high level index.

The Compress Word List step of the preferred embodiment is described in detail by the following pseudocode:

1. Get word from the alphabetic word list file created in Phase IB. When done, Go to 7.
2. Use the word number to index into the WNAA to get the length and offset of the index for this word.
3. Compress into variable length record as follows:
   | | |
   |---|---|
   | Length of record | 1 byte |
   | Number of references in Index | 1–4 bytes |
   | Offset for index in packet | 1–4 bytes |
   | Number of bytes in this index | 1–4 bytes |
   | Left end compaction count (from previous word) | 1 byte |
   | Word itself without a null | 1-N bytes |

(The variable length format takes a long word from high to low bytes with the two highest bits indicating how many bytes should be used: 00 = 1 byte, 01 = 2 bytes, 10 = 3 bytes, 11 = 4 bytes).
4. Write this record out to a temporary file.
5. Keep a word every 10k bytes for high level word index. Reinitialize front end compaction for a word that has the high level index.
6. Next word. Go to 1.
7. End of Phase IID.

E. Merge Final Index

In the final step, the index data created in the previous steps is written to a permanent index file. The final index in the preferred embodiment contains seven packets of data plus an optional packet. Referring to Table 4, sample packet data of the preferred embodiment is shown.

TABLE 4

| | | | |
|---|---|---|---|
| PACKET 1. | NumberUniqueWords | = | 2000 |
| | PathRecSize | = | 88 bytes |
| | NumGranules | = | 100 |
| | FileRecSize | = | 25 Kbytes |
| | NumPasses | = | 2 |
| | NumFiles | = | 10 |
| PACKET 2. | aaron | offset 0 | |
| | mulek | offset 1095 | |
| PACKET 3. | c:[r]esearchffinfo>eneral[*].* | | |
| | c:[r]esearch esting[*].dec | | |
| PACKET 4. | histalma.hst 10/10/90 4:12 p. 49,425 bytes pathrec = 0 | | |
| | . . . . . | | |
| | aletsumm.hst 4/1/85 12:00 a. 1,954 bytes pathrec = 1 | | |

TABLE 4-continued

| PACKET 5. | file = 1, | offset = 0 | | |
|---|---|---|---|---|
| | file = 1, | offset = 245 | | |
| | file = 1, | offset = 2481 | | |
| | . | . | | |
| | . | . | | |
| | . | . | | |
| | file = 2, | offset = 0 | | |
| | . | . | | |
| | . | . | | |
| | . | . | | |
| | file = 10 | offset = 598 | | |
| PACKET 6. | aaron | numrefs = 5 | offset =0 | indexsize = 5 |
| | . | . | . | . |
| | . | . | . | . |
| | . | . | . | . |
| | mulek | numrefs = 100 | offset = 5000 | indexsize = 40 |
| PACKET 7. | Compressed Full Text Index | | | |
| PACKET 8. | "Delete List" of Deleted Documents (Incremental merge only) | | | |

Referring to Table 4:

Packet 1 contains general information about the index including the total number of words in the index, the path size, and the index file name size.

Packet 2 contains a high level index comprising the word entry and offset for every 10K bytes of the index.

Packet 3 contains directory path information for each indexed file for the purpose of locating the indexed files.

Packet 4 includes a record containing the file name for each indexed file. It may reference the directory path number in the third packet for each such file.

Packet 5 contains granule cross-reference records pointing to a file number and an offset within the file (as identified in Packet 4) for identifying the location of each granule boundary. This information is necessary for indexes that are not of "document level" granularity, e.g., with sentence or paragraph level granularity.

Packet 6 contains the compressed temporary word list file created in the Compress Word List step (Phase IID).

Packet 7 contains the final compressed full text index file created in Phase IIB and IIC.

Packet 8 contains a list indicating the documents that have been deleted. The list is only created during an incremental merge.

INDEX MERGE AND UPDATE

As documents change, the integrity of the index must be maintained by updating it to reflect the changes. Likewise, if the amount of computer's memory is insufficient to permit the creation of one large index, many small indexes can be created and then merged into the final large index.

As it would be inefficient to re-create an entire index each time an indexed document is modified or new documents are added, the present invention includes a method for quickly and efficiently updating the existing full text index ("Incremental Merge"). Similarly, the invention also provides for computers with insufficient memory to hold a single large index ("Low Memory Merge"). This is accomplished generally by first creating a separate index for the new documents and then merging it with the existing index. For the Incremental Merge, a separate list of deleted documents is also maintained so that references to deleted documents may be removed from the index or ignored on retrieval.

The merge is performed in three main steps. First, the Alpha Lists for the indexes are merged together in alphabetical order to form a new Temporary Alpha List. Then the compressed indexes from each index are merged together. Also, the temporary alpha list is compressed and a new high-level index into the compressed alpha list is created. Finally, the directories, files and granule cross-reference list for each index are merged together. If the delete list needs to be used upon retrieval, it will be appended to the end of the completed index. The following is a summary of the method for merging two indexes:

1. Open temporary files for the merge.
2. Get index information for both indexes.
3. Merge the Alpha Lists into a temporary alpha list.
4. Merge the compressed indexes—compress the Temporary Alpha List to make a new compressed Alpha List and make a new index into the compressed Alpha List.
5. Merge the directory, file, and granule lists. If it is an INCREMENTAL MERGE of an existing index, mark the deleted documents in the granule list and use the delete list to remove references to documents that have been deleted or store the delete list with the index or ignore during retrieval of the index.
6. Write the final merged index to a permanent file.
7. Append optional delete list to index.

Step 4, in which the compressed indexes are merged, is the key step of the merge method. The temporary alpha list is traversed sequentially, word by word. If the word is in either the first or second index, but not both, the information in the index entry for the word is copied to the new index. If the word is in both indexes, the index information for the word in the two indexes must first be concatenated into a single entry.

The difficulty of concatenating two index entries for a single word arises in merging the compressed word reference lists when they are in compressed bitstring format (see Phase IIC, Compress Index, above). (The two compressed index entries to be concatenated will be referred to hereinafter as index stream 1 and index stream 2). The problem arises when the last code in index stream 1 is in bitstring format and all the positions in the compressed bitstring are not used, i.e., there are more bits available than granules to be encoded. For example, Table 5 shows a one byte encoded bitstring in which only 3 granules are indexed.

TABLE 5

| Bit String Code | Document Number | | | | |
|---|---|---|---|---|---|
| | 1 | 2 | 3 | 4 | 5 |
| 0 1 1 | 1 | 0 | 1 | 0 | 0 |

Since the minimum bitstring size is one byte (8 bits), of which the first 3 bits comprise the code indicating that a bitstring representation follows, and only 3 bits are used to represent the 3 granules, there are 2 unused bits in the bitstring code. In Table 5, the indexed word is found in granules 1 and 3. Thus, the 4th bit (representing document 1) is '1', the 5th bit (representing document 2) is '0', and the 6th bit is '1'. The last 2 bits are not used and are filled with '0's. These extra bits are referred to herein as "overhang".

In order to concatenate index stream 2 into this index, it is necessary to eliminate the overhang and begin at the first unused bit (the 7th bit). Otherwise, the 2 unused bits in the bitstring will be taken to represent the next 2 granules in the new list, which will make the index inaccurate (by causing all granules represented in the index stream to be shifted 2 positions). One method to correct the problem would be to modify the 2 previously unused bits to reflect the second index (i.e., placing a '1' in each of the 2 bits representing a granule in which the word occurs as coded in index stream 2). However, this method is not viable because index stream 2 is in compressed form and the entire index stream would have to be decompressed and recoded to reflect the shift, an inefficient option. The present invention overcomes this problem with a "negative jump" byte.

The negative jump byte contains a value that reflects the size of the overhang in the last byte of index stream 1. It is placed between index streams 1 and 2, thereby enabling index stream 2 to be efficiently concatenated to it without altering the compressed form of either index stream. Thus, when the compressed concatenated index is later decoded back to a bitstring for retrieval, a counter keeps track of the current position (i.e., granule number) in the decoded bitstring. When the decoder encounters a negative jump byte, the counter is decremented by the amount indicated in the negative jump byte. This allows the decoder to re-adjust to the correct granule number. For example, after decoding the bitstring shown in Table 5, the counter would have a value of 6. It would then encounter the negative jump byte with a value of 2 (or greater, see below), indicating that there are 2 overhang bits in the previous bitstring. The counter would then be reset to its correct value of 4 and continue creating the decoded bitstring, beginning in the 4th position. It must also be noted that when index stream 2 is created, it must be shifted "n" bits, where "n" is the number of granules (e.g., if index stream 1 has 2 granules, index stream 2 must be created to start marking at granule 3).

In the preferred embodiment, the negative jump byte is indicated in the "Control Op Code" (the first 4 bits). Although any value could be assigned to the Control Op Code, '1011' is used in the preferred embodiment. The next bit is set to '1', which signifies a negative jump, and the last three bits represent the size of the jump, as shown in Table 6:

TABLE 6

| Code | Negative Jump Size |
|---|---|
| 000 | 1 |
| 001 | 2 |
| 010 | 3 |
| 011 | 4 |
| 100 | 5 |
| 101 | 6 |
| 110 | 7 |
| 111 | 8 |

The largest possible negative jump needed is 8.

If a negative jump byte is used, it is also necessary that the first code of index stream 2 be a delta or an absolute element reference. This is because the code needs to be reset to represent the next granule number in sequence after the last granule number in index stream 1 and that can only be done with delta or absolute element reference. For example, if index stream 1 has only 2 possible "hits" with ony one "hit" in the last position (01), it would be encoded as a delta 2. Suppose index stream 2 has only one possible "hit" and it has a "hit" at that position (1). Because index stream 2 is shifted 2 positions, it is encoded as a delta 3. Thus, when these two index streams are concatenated, the delta 3 of index stream 2 must be modified to a delta 1 so that is decode accurately.

There are two possible cases that may be encountered in concatenating index streams where the last byte is in compressed bitstring format. First, when the last encoded bit of index stream 1 ends before the first "hit" of index stream 2, concatenation is accomplished by adjusting the first code (delta or absolute element reference) of index stream 2 to the correct value according to the last "hit" in index stream 1. In this case, a negative jump byte is not necessary because the first code in index stream 2 can be adjusted to account for the overhang. For example, in the example in Table 5, if the first "hit" in index stream 2 occurs in the sixth granule, a negative jump byte would not be necessary. The first code in index stream 2, a delta code, would be adjusted from 6 (indicating the indexed word did not occur until the sixth granule) to 1. It then takes only a delta 1 to get to the 6th position. The bitstring takes 5 positions, so a delta 1 moves the counter to the 6th position. The remaining codes of index stream 2 are then concatenated without alteration to form the new index stream. (The equation used to calculate the negative jump (below) is also used to calculate the new delta value or absolute element reference (if it will not fit in a delta). That is, the value used is the absolute value of the result of the equation.)

The second case, the overlap case, exists when the last encoded bit of index stream 1 ends after or on the first "hit" of index stream 2. A negative jump byte is required only in the overlap case because one or more of the overhang bits in index stream 1 would otherwise be incorrect (i.e., would contain a '0' where it should contain a '1'). The size of the negative jump code (which is encoded as one less than the actual negative jump size) is calculated by the following equation:

$$Overhang + (LastHit\ (of\ Index\ Stream\ 1) - FirstHit\ (of\ Index\ Stream\ 2))$$

The overhang is equal to the number of 0's following the last '1' in the encoded bitstring that is the last byte of index stream 1, e.g., the overhang would be '2' in Table 5. The "LastHit" is equal to the granule number of the last occurrence of the indexed word in index stream 1, i.e., the position of the last '1'. The "FirstHit" is equal to the granule number of the first occurrence of the indexed word in index stream 2, i.e., the position of the first '1'. The negative jump byte is then placed after the last byte in index stream 1 and the first code in index stream 2 is replaced by a delta code with a value of '1'. Finally, the remainder of index stream 2 is then copied to the new index stream.

Step 4 is detailed in the following pseudocode:

| | |
|---|---|
| 1. | While there are more index words in the temporary alpha list, get the next word, otherwise go to 2 |
| 1.1 | If the word is only in index 1 then |
| 1.1.1 | Write the index entry for the word in index 1 to the new index |
| 1.1.2. | Write the word to the new compressed alphabetical word list in the new index |
| 1.1.3. | If the word needs to be placed in the new high level index to the Alpha List (see Phase IID), put it in. |
| 1.2 | If the word is only in index 2 then |
| 1.2.1. | Write the index entry for the word in index 2 to the new index |
| 1.2.2. | Write the word to the new compressed alphabetical word list in the new index |
| 1.2.3. | If the word needs to be placed in the new high level index to the Alpha List (see Phase IID), put it in. |
| 1.3 | If the word is in both index 1 and index 2 then |
| 1.3.1 | Do MERGEINDEX (below) |
| 1.3.2. | Write the word to the new compressed alphabetical word list in the new index |
| 1.3.3 | If the word needs to be placed in the new high level index to the Alpha List (see Phase IID), put it in. |
| 1.4 | Go to 1 |
| 2. | Done |

MERGEINDEX

| | |
|---|---|
| 1. | While writing the index piece for the word from index 1 ("index stream 1") to the new index stream |
| 1.1. | Get the LastHit |
| 1.2 | Also get the Overhang |
| 2. | Get the firsthit from the index piece for the word in index 2 ("index stream 2") |
| 3. | Granulespace = LastHit − FirstHit |
| 4. | Granuleover = Granulespace + Overhang |
| 5. | If Granuleover < 0 (the index streams do not overlap) |
| 5.1. | Newdelta = −1 * Granuleover (for first code in index stream 2) |
| 5.2. | If newdelta < 64 |
| 5.2.1. | Encode newdelta as a 1 byte delta and write it out to the new index stream |
| 5.2.2. | Copy the rest of index stream 2, except the first code, out to the new index stream |
| 5.3. | If newdelta < 4096 and newdelta > 63 |
| 5.3.1. | Encode the newdelta as a 2 byte delta and write it out to the new index stream |
| 5.3.2. | Copy the rest of index stream 2, except the first code, out to the new index stream |
| 5.4. | If newdelta > 4095 |
| 5.4.1. | Write out the first code of index stream 2 as is (absolute code), to the new index stream |
| 5.4.2. | Copy the rest of index stream 2 out to the new index stream |
| 6. | If (Granuleover > −1) && (Granulespace < 1) (The index streams overlap) then |
| 6.1. | NegativeJump = Overhang + Granulespace |
| 6.2. | Encode the negative jump into the control op code |
| 6.3. | Write out the negative jump control op code to the new index stream |
| 6.4. | Write out a 1 byte delta 1 to the new index stream |
| 6.5 | Copy everything after the first code in index stream 2 to the new index stream. |

What is claimed is:

1. A computer system for creating a full text index associated with a source text including one or more documents, each document comprising one or more granules, and each granule comprising one or more words, the computer system comprising:

a first storage means for storing the source text;

processing means for creating the full text index in two phases;

memory means coupled with the processing means for storing data used to create the full text index; and a second storage means associated with the processing means for storing the full text index;

the processing means performing the steps of:

in the first phase, reading the source text; creating a word list with an entry for each unique word in the source text, said word list comprising a first table containing one or more entries of a first type, each said first table entry associated with a unique hash number and addressing a second table containing one or more entries of a second type, each said second table entry addressing a binary tree comprising nodes for one or more unique words in the source text; and creating a non-repeating word number stream comprising an entry for each unique word in each granule of the source text; and in the second phase, creating an array in the memory means comprising an entry for each unique word in the source text, said entry including a data field operative to contain for the location of the unique word in an uncompressed index; creating the uncompressed index based on the array and the non-repeating word number stream, said uncompressed index including granule references associated with each of said unique words; and compressing the uncompressed index into the full text index and storing the full text index in said second storage means.

2. The computer system of claim 1 wherein for each unique word in the source text, granule reference list data is included in the uncompressed index, and said granule reference list data is compressed by a combination of one or more compression methods.

3. The computer system of claim 2 wherein the compression methods by which granule reference list data associated with a unique word in the source text is compressed are comprised of run length encoding, bit string encoding, delta encoding, and absolute element reference encoding.

4. The computer system of claim 3 wherein:

compression by said run length encoding comprises storing the granule number associated with a first of two or more consecutive granules in which the unique word occurs in combination with the total number of the consecutive granules in which the unique word occurs;

compression by said bit string encoding comprises storing a sequence of one or more bits corresponding to the number of granules in the source text in which each said bit corresponding to a granule number associated with the granule in which the unique word occurs has a value of '1' and each remaining said bit has a value of '0';

compression by said delta encoding comprises storing a value representing the number of consecutive granules in which the unique word does not occur between granules in which the unique word occurs; and compression by said absolute element reference encoding comprises storing a granule number corresponding to a granule in which the unique word occurs.

5. The computer system of claim 1 wherein each unique word in the source text is associated with a word number and each granule in the source text is associated with a granule number.

6. The computer system of claim 5 wherein the non-repeating word number stream is comprised of a sequence of said word numbers and a boundary demarcation for each said granule for recording the granule number in which said words occur, wherein each unique word number appears at most once between each said granule boundary demarcation.

7. The computer system of claim 6 wherein for each unique word in the source text, granule reference list data is included in the uncompressed index, the granule reference list data associated with each unique word in the source text comprising a sequential list of granule numbers associated with the granules in which the unique word occurs.

8. The computer system of claim 1 further comprising retrieval means for accessing the full text index.

9. The computer system of claim 1 wherein the steps of the second phase are iterated one or more times, further comprising the step of merging a first full text index stored in the second storage means with a second full text index so as to create a third full text index.

10. A computer system for creating a full text index associated with a source text one or more documents, each document comprising one or more granules, and each granule comprising one or more words, the computer system comprising:

a first storage means for storing the source text;

processing means for creating the full text index in two phases;

memory means coupled with the processing means for storing data used to create the full text index; and a second storage means associated with the processing means for storing the full text index;

the processing means performing the steps of:

in the first phase, reading the source text;

creating a word list with an entry for each unique word in the source text, said word list comprising a first table containing one or more entries of a first type, each said first table entry associated with a unique hash number and addressing a second table containing one or more entries of a second type, each said second table entry addressing a binary tree comprising nodes for one or more unique words in the source text;

creating a non-repeating word number stream associated with the word list, the non-repeating word number stream comprising an entry for each unique word in each granule of the source text;

creating an alphabetically ordered word list associated with the word list; and in the second phase, allocating portions of the memory means for an in-memory index;

creating an array in the memory means associated with the in-memory index, the array comprising a data field operative to contain the location of each unique word in the in-memory index;

placing granule reference list data associated with the non-repeating word number stream in the in-memory index, said granule list data being associated with said unique words;

compressing and storing the in-memory index in the second storage means;

alphabetically ordering the compressed granule reference list data and storing the data in the second storage means; and storing data used to create the full text index in the second storage means.

11. The computer system of claim 10 wherein each unique word in the source text is associated with a word number and each granule in the source text is associated with a granule number.

12. The computer system of claim 11 wherein the non-repeating word number stream is comprised of a sequence of said word numbers and a boundary demarcation for each said granule for recording the granule number in which said words occur, wherein each unique word number appears at most once between each said granule boundary demarcation.

13. The computer system of claim 12 wherein for each unique word in the source text, the granule reference list data comprises a sequential list of granule numbers associated with the granules in which the unique word occurs.

14. The computer system of claim 13 wherein the granule reference list data is compressed by a combination of one or more compression methods.

15. The computer system of claim 14 wherein the compression methods by which granule reference list data associated with a unique word in the source text is compressed are comprised of run length encoding, bit string encoding, delta encoding, and absolute element reference encoding.

16. The computer system of claim 15 wherein:

compression by said run length encoding comprises storing the granule number associated with a first of two or more consecutive granules in which the unique word occurs in combination with the total number of the consecutive granules in which the unique word occurs;

compression by said bit string encoding comprises storing a sequence of one or more bits corresponding to the number of granules in the source text in which each said bit corresponding to a granule number associated with the granule in which the unique word occurs has a value of '1' and each remaining said bit has a value of '0';

compression by said delta encoding comprises storing a value representing the number of consecutive granules in which the unique word does not occur between granules in which the unique word occurs; and compression by said absolute element reference encoding comprises storing a granule number corresponding to a granule in which the unique word occurs.

17. The computer system of claim 10 wherein the steps of the second phase are iterated one or more times, further comprising the step of merging a first full text index stored in the second storage means with a second full text index so as to create a third full text index.

18. A computer system for creating a full text index associated with a source text including one or more documents, each document comprising one or more granules, and each granule comprising one or more words, the computer system comprising:

a first storage means for storing the source text;

processing means for creating the full text index in two phases;

memory means coupled with the processing means for storing data used to create the full text index; and a second storage means associated with the processing means for storing the full text index;

the processing means performing the steps of:

parsing the source text into one or more granules, a granule number being associated with each granule;

in the first phase, reading words from the source text, assigning a word number to each unique word, and creating a word list with an entry for each such unique word and associated word number, said word list comprising a first table containing one or more entries of a first type, each said first table entry associated with a unique hash number and addressing a second table containing one or more entries of a second type, each said second table entry addressing a binary tree comprising nodes for one or more unique words in the source text;

creating a non-repeating word number stream comprised of a sequence of said word numbers and a boundary demarcation for each said granule for recording the granule number in which each word occurs, wherein each unique word number appears at most once between each said granule boundary demarcation;

creating an alphabetically ordered list of unique words in the source text, wherein the alphabetically ordered list includes the word number associated with each unique word;

in the second phase, determining memory requirements for an in-memory index comprising a granule reference list for each unique word in the source text, and allocating a portion of the memory means for each said granule reference list;

creating an array in the memory means comprising an entry for each unique word in the source text wherein each said entry contains a data field operative to contain the location in the in-memory index associated with the unique word;

creating the granule reference list for each unique word in the source text by sequentially reading the non-repeating word number stream and, for each granule boundary demarcation in the stream, incrementing a granule number counter and, for each word number in the stream, recording the value of the granule number counter in the portion of the memory means allocated for the unique word in the source text associated with the word number;

compressing the in-memory index in the second storage means;

alphabetically ordering the compressed in-memory index and storing the compressed in-memory index in the second storage means; and storing the compressed in-memory index and data used to create the full text index in the second storage means.

19. The computer system of claim 18 wherein each said granule reference list comprises a sequential list of granule numbers associated with the granules in which the associated unique word occurs.

20. The computer system of claim 19 wherein the granule reference lists are compressed by a combination of one or more compression methods.

21. The computer system of claim 20 wherein the compression methods by which a granule reference list associated with a unique word in the source text is compressed are comprised of run length encoding, bit string encoding, delta encoding, and absolute element reference encoding.

22. The computer system of claim 21 wherein:

compression by said run length encoding comprises storing the granule number associated with a first of two or more consecutive granules in which the unique word occurs in combination with the total number of the consecutive granules in which the unique word occurs;

compression by said bit string encoding comprises storing a sequence of one or more bits corresponding to the number of granules in the source text in which each said bit corresponding to a granule number associated with the granule in which the unique word occurs has a value of '1' and each remaining said bit has a value of '0';

compression by said delta encoding comprises storing a value representing the number of consecutive granules in which the unique word does not occur between granules in which the unique word occurs; and compression by said absolute element reference encoding comprises storing a granule number corresponding to a granule in which the unique word occurs.

23. The computer system of claim 22 wherein the combination of one or more compression methods utilized to compress the granule reference lists is determined by a triggering method so as to minimize the size of the compressed index.

24. The computer system of claim 18 wherein the full text index which is stored in the second storage means comprises multiple packets of data.

25. The computer system of claim 18 wherein the steps of the second phase are iterated one or more times, further comprising the step of merging a first full text index stored in the second storage means with a second full text index so as to create a third full text index.

26. A method for creating in a computer system a full text index associated with a source text including one or more documents, each document comprising one or more granules, and each granule comprising one or more words, the computer system comprising a first storage means for storing the source text, a processing means for creating the full text index in two phases, memory means coupled with the processing means for storing data used to create the full text index, and a second storage means associated with the processing means for storing the full text index, the method comprising the steps of:

in the first phase, reading the source text; creating a word list with an entry for each unique word in the source text, said word list comprising a first table containing one or more entries of a first type, each said first table entry associated with a unique hash number and addressing a second table containing one or more entries of a second type, each said second table entry addressing a binary tree comprising nodes for one or more unique words in the source text; and creating a non-repeating word number stream comprising an entry for each unique word in each granule of the source text; and in the second phase, creating an array in the memory means comprising an entry for each unique word in the source text, said entry including a data field operative to contain the location of the unique word in an uncompressed index; creating the uncompressed index based on the array and the non-repeating word number stream, said uncompressed index including granule references associated with each of said unique words; and compressing the uncompressed index into the full text index and storing the full text index in said second storage means.

27. The computer system of claim 26 wherein the steps of the second phase are iterated one or more times, further comprising the step of merging a first full text index stored in the second storage means with a second full text index so as to create a third full text index.

* * * * *

UNITED STATES PATENT AND TRADEMARK OFFICE
CERTIFICATE OF CORRECTION

PATENT NO. : 5,717,912
DATED : February 10, 1998
INVENTOR(S) : Ronald P. Millett et al.

It is certified that error appears in the above-identified patent and that said Letters Patent is hereby corrected as shown below:

Column 25, line 21 after "contain" delete "for".

Column 26, line 18, after "text" insert --of--.

Signed and Sealed this

Fifth Day of May, 1998

Attest:

BRUCE LEHMAN

Attesting Officer

Commissioner of Patents and Trademarks